United States Patent [19]

La Vista

[11] 4,403,962
[45] Sep. 13, 1983

[54] MANNEQUIN HEAD FOR TRAINING

[76] Inventor: Leonard A. La Vista, 185 Seminol Blvd., Melbourne, Fla. 32901

[21] Appl. No.: 329,762

[22] Filed: Dec. 11, 1981

[51] Int. Cl.³ ............................................. G09B 25/00
[52] U.S. Cl. ..................................................... 434/94
[58] Field of Search ........................... 46/164; 434/94; 132/45 R, 45 A

[56] References Cited

U.S. PATENT DOCUMENTS

| | | | |
|---|---|---|---|
| 2,558,516 | 6/1951 | Granberg | 132/45 R |
| 2,781,611 | 2/1957 | Bills et al. | 46/164 X |
| 2,919,702 | 1/1960 | Olivo | 132/45 R X |
| 2,968,104 | 1/1961 | Ito | 434/94 |
| 2,975,534 | 3/1961 | Lutz | 434/94 |
| 3,458,943 | 12/1969 | Trowbridge | 434/94 |
| 4,317,462 | 3/1982 | Steiner | 434/94 X |

FOREIGN PATENT DOCUMENTS 2317889 10/1974 Fed. Rep. of Germany ........ 434/94

Primary Examiner—Harland S. Skogquist
Attorney, Agent, or Firm—Duckworth, Allen, Dyer & Pettis

[57] ABSTRACT

A mannequin head form having human or artificial hair in which the hair bearing surfaces are marked to permit demonstration of hairdressing techniques by an instructor and to guide a student in learning and practicing such techniques. Respective ones of a group of head forms may have markings and indicia to show: areas for blocking for permanent waving; shapes and loctions of curls; direction of finger and tool placement for waving and the like; directions for partitioning the hair for cutting, parting, bleaching, and coloring; and other general or specialized instructional markings. The markings and indicia are visible to the user as the hair is manipulated.

9 Claims, 6 Drawing Figures

MANNEQUIN HEAD FOR TRAINING

BACKGROUND OF THE INVENTION

1. Field of the Invention

The present invention relates to devices for teaching hairstyling and the like, and more particularly to a mannequin head having hair thereon and which is marked with various indicia to guide a student in learning hairstyling.

2. Description of the Prior Art

In beauty schools in which hairstyling and cutting is taught, it is common for the instructor to demonstrate on mannequin heads or on human models, and thereafter to require the students to attempt to duplicate the demonstrated techniques. It is also common to utilize two dimensional charts and photographs as well as written descriptions to guide the student in learning specific hairdressing skills. However, the effectiveness of these prior art techniques is limited requiring much trial and error on the part of the student to become proficient.

It is clear that some form of three dimensional teaching aid or devices would be more efficient and would minimize individual attention of the instructor. A step in this direction has been made by Trowbridge in U.S. Pat. No. 3,458,943 which teaches a model head covered with Velcro$^R$ material over the area normally covered by hair. Swatches of wig material made of or simulating human hair are provided that can be worked individually on a particular area of the head. While of some help in defining specific areas of the head, no help in direction or rolling, combing or cutting are indicated and fall short of an ideal teaching aid. U.S. Pat. No. 2,975,534 to Lutz comprises an inflatable balloon-like device which ca be blown up and attached to a base. The device may have certain instructional patterns for hairstyling indicated as if the device were a head. While perhaps superior to a flat or two dimensional chart, the device does not allow actual manipulation of the hair but only provides reference patterns.

SUMMARY OF THE INVENTION

My invention contemplates a mannequin head form having a natural size with artificial or human hair attached to the scalp portions and of proper length for practice of hairstyling. The device may take many forms: for example, a hollow head form may be used formed from plastic or the like. The hair is then stitched through the surface of the form in the manner that wigs and hairpieces are made. Prior to attaching of the hair, the scalp portion is marked off to define various areas and shapes, each of which is to indicate the portion of the head for a particular hairdressing technique. The marked off areas may also include additional markings indicating the direction to which the hair is to be combed or curled. Each of the marked off areas may be identified by numbers, letters, or other indicia. In using my teaching aid, the instructor would first demonstrate the particular hair treatment applicable to one of the marked off areas indicating how the markings indicate the direction of various operations, and thereafter, each student would reproduce the demonstrated work on his or her model head. With appropriate notes, or written instructions, a student may practice alone with my novel training mannequin head and will, of course, by guided by the markings and indicia which may be seen by combing out the hair attached to the particular areas.

In addition to indicating areas for specific treatment, other indicia may be applied; for example, locations of individual curls may be shown by dashed or solid line geometrical forms in the appropriate places on the head. Where finger waves or other hair treatments requiring the use of the fingers or implements, arrows may be placed appropriately to indicate the direction of working or of applying the fingers or implements. It is to be understood that a mannequin head will be designed and marked for a particular type of styling and that a number of such heads will be used to cover various styles. To reduce the cost of the teaching aid of my invention and to encourage keeping up to date with changing hairstyles, a version may be constructed using relatively thin rubber in the form of a cap which may then be installed on a permanent head form made from plastic, or similar materials.

It is therefore a principal object of the invention to provide a teaching aid in the form of a three dimensional model head with markings and indicia on the scalp portion thereof to provide a three dimensional instructional device for use by hairstyling instructors and students.

It is another object of the invention to provide a teaching aid for an instructor which is used to demonstrate hairstyling and hairdressing techniques to a student with referencce to various markings and indicia on the device.

It is yet another object of my invention to provide a mannequin head having hair attached thereto in which the scalp portion is marked off into appropriate areas in which a different hairdressing or styling technique may be applied to different areas.

It is still another object of my invention to provide a mannequin head for students learning the hairstyling and hairdressing art to be guided during practice by various markings and indicia on the scalp area of the model head.

It is a further object of my invention to provide a model head having hair attached to the scalp area thereof in which the scalp area is marked with arrows, patterns, and the like which may indicate the direction of applying the fingers or tools and the positions of curls or other decorative hair forms.

These and other objects and advantages will become apparent from the detailed description and the drawings.

DETAILED DESCRIPTION OF THE PREFERRED EMBODIMENT

Figure 1:
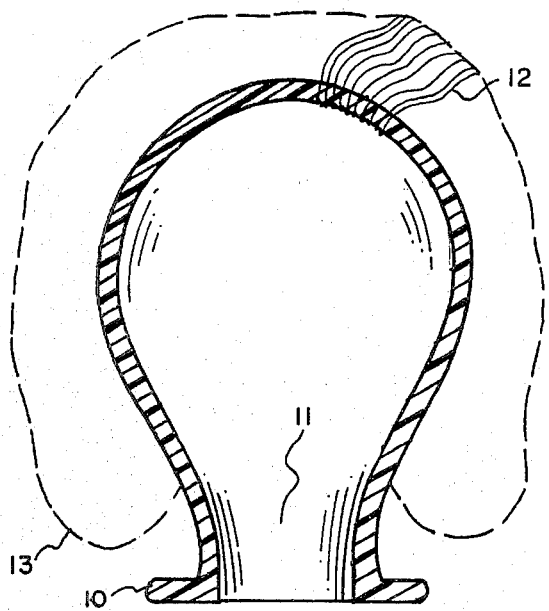
FIG. 1 is a cross-sectional view of a typical head form of the invention showing the manner of attachment of hair thereto.

Referring to FIG. 1, a cross-sectional view through a typical mannequin head form suitable for the invention is shown. A head form 10 may be formed from plastic or similar material having a wall thickness sufficient to provide a rigid form suitable for use by students in learning the hairdressing art. It is to be understood that the form 10 is shown for exemplary purposes only and many variations are equally well suited to my invention. Form 10 has a hollow neck portion 11 which may be mounted on a permanent stand or a weighted base when in use. Either human or artificial hair 12 is inserted through the walls of head form 10 and sewn or otherwise fastened to the interior surface. A few strands of hair 12 are shown attached to illustrate the attachment of hair; however, it is to be understood that the entire normal hair growing area of a female head is covered with hair as indicated by the dashed line 13.

Figure 2:
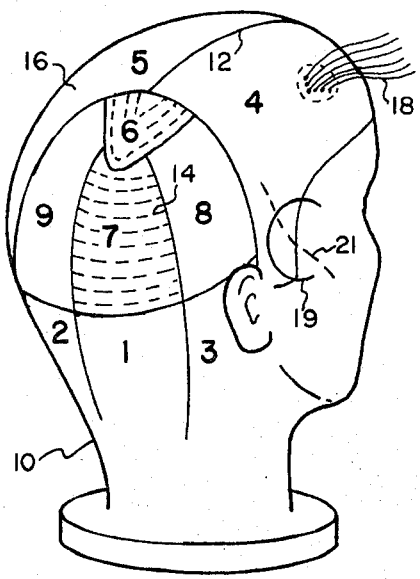
FIG. 2 is a view of a mannequin head form of the invention before attaching hair thereto and indicating typical pattern markings thereon.

Prior to attaching hair to a head form 10, in accordance with my invention, the scalp area may be marked off for various purposes. Turning to FIG. 2, a head form 10 is shown prior to attachment of hair thereto with markings appropriate for teaching of permanent waving. To this end, the scalp area is marked off in blocks 16 by bold lines 12 with each separate block identified by a number or other indicia. In this example, blocks 1 through 9 may be seen although a greater or lesser number of blocks may be utilized depending upon the types of hair styles to be taught. Although a few strands of hair 18 are shown for illustrative purposes, the remainder of the hair has been omitted to better show the blocking markings and indicia. Each block includes additional markings 14 which indicate certain directions of handling of the hair strands in such areas. Other types of markings are shown at 19 which shows a crescent marking indicating the direction of forming certain curls and a dashed line 21 indicating finger or implement placing directions. After attachment of the hair to head form 10, the markings and indicia are easily visible to the user as the hair is worked.

A mannequin head form 10, as in FIG. 2, is utilized by a hairdressing instructor to first demonstrate to a group of students how to block or section the hair for permanent waving. For example, the hair in block number 7 would be picked up with the fingers and clipped together in some manner to maintain it separate from the hair in an adjacent section such as block 8. The hair in each block is sectioned out and clipped. Thus, the student is shown how to separate the various areas of the hair by reference to markings 12 to isolate those areas for individual treatment. After blocking of the hair, the instructor may then illustrate the proper manner of applying the curling rods to the hair in each block. For example, in block 7, the rods would be applied to thin layers of hair along the dashed lines. Similarly, in block 6, rods would be applied to the thin layers of hair in the direction of dashed lines 14 so as to form a V pattern. As may be understood, each block includes dashed lines 14 indicating directions for application of rods but are omitted in FIG. 2 for clarity. Where curls are formed as indicated by marking 19, the fingers are placed along dashed line 21 to form the desired curl in the proper orientation.

After demonstrations by the instructor, the student may then easily repeat the action of the teacher by simply following the blocking lines 12 for each of the blocks 16 on his or her mannequin head form. The head form 10 thus provides a three dimensional guide and eliminates guess work and judgment as to proper blocking of the hair during the early stages of the students training. As may be recognized, the three dimensional form eliminates the necessity for a number of two dimensional drawings or illustrations which are often confusing to the new student.

Figure 3:
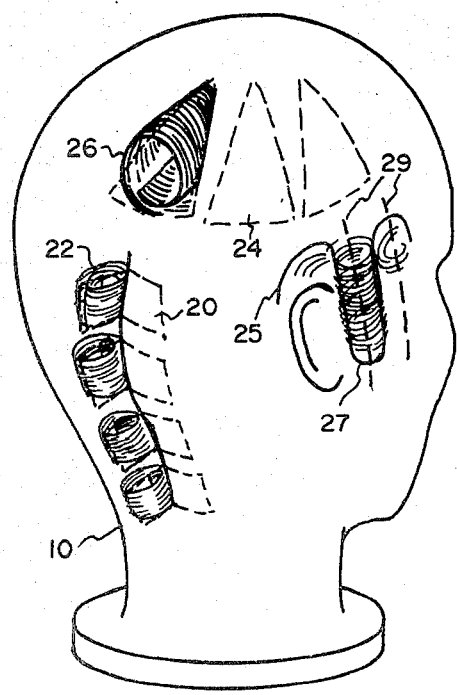
FIG. 3 is a mannequin head form of the invention showing markings which may be used to indicate locations of standup curls and of arc curls.

Many other types of markings may be used as well as the blocking marks 12 discussed above. In FIG. 3, for example, mannequin head form 10 is shown with several special curl forming markings. It is to be understood that this illustration is not of an actual head form but is merely presented to illustrate such special markings which are commonly used with various hair styles. Thus, the types of markings shown may be used in appropriate areas in conjunction with other basic markings. A set of curl setting patterns is shown by the dashed line markings 20 for a series of straight curls 22. As may be noted, the size of a marking 20 will indicate the approximate length and thickness of the curl 22. Another type of curl which has a conical form is shown at 26 with the dashed line markings 24 indicating the approximate shape ad size of each curl and the location on the head form for such curls. Marking 25 indicates an S-shaped pattern for producing parallel curls 27. Dashed lines 29 indicate the direction for placing of the fingers in forming such curls.

Figure 4:
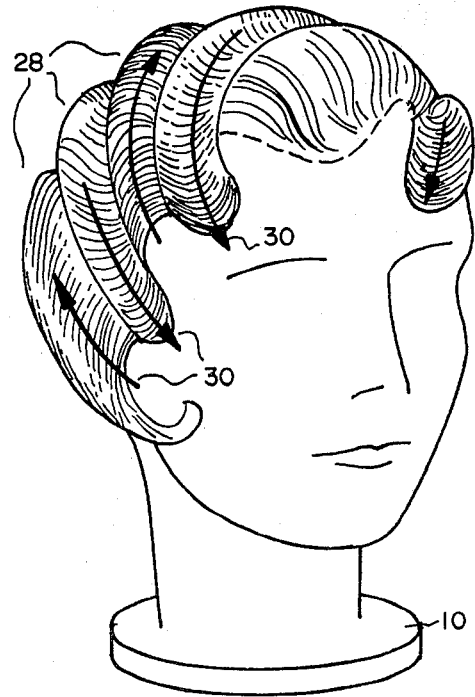
FIG. 4 is a mannequin head form of the invention showing arrow markings which may indicate finger placement positions for producing finger wave-type styling.

Markings to indicate finger waving are shown in FIG. 4 on form 10. A number of curved arrows 30 are marked on the head form which show both the directions for placement of the fingers during curling and the direction of the crests of the curls 28.

Figure 5:
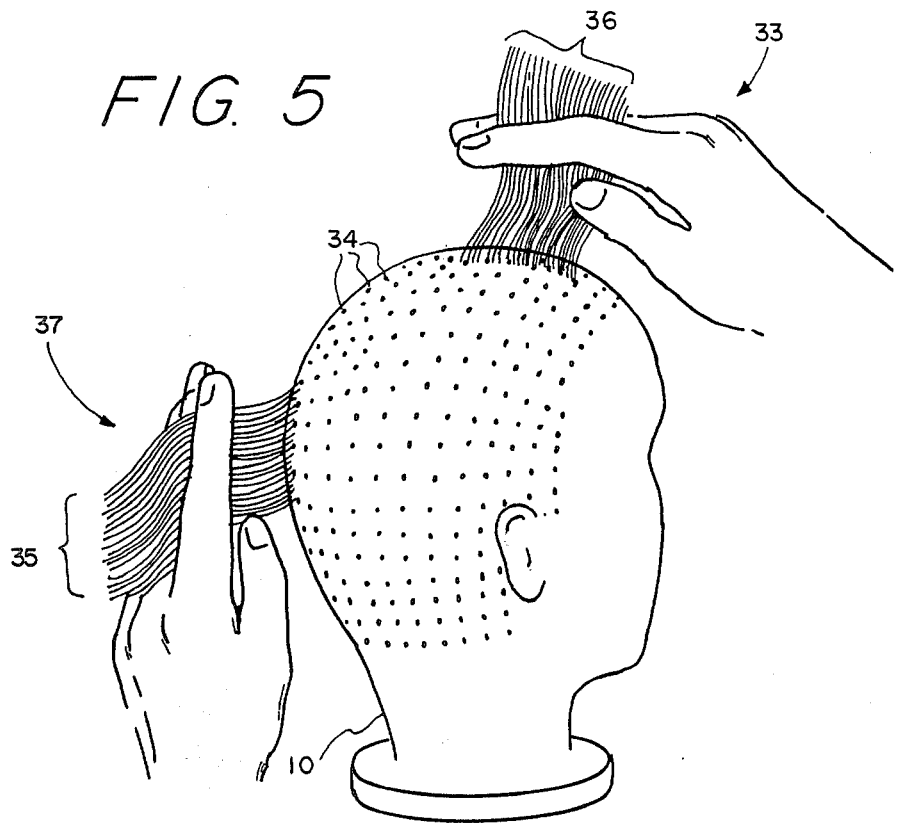
FIG. 5 is a diagrammatic representation of a mannequin head form of the invention with the majority of the hair omitted showing a dot pattern array forming both horizontal and vertical line patterns useful for teaching steps for cutting, parting, bleaching and coloring of hair.

Another useful mannequin head form marking is indicated in FIG. 5 which consists of an array of dots covering the hair area of form 10. As may be understood, except for strands of hair 35 and 36, the hair has been omitted in FIG. 5 for illustrative purposes. The head form of FIG. 5 is useful in training students in hair cutting procedures and parting techniques since the dots are arranged to form both vertical and horizonal rows. During cutting and parting of the hair, it is desirable to pick up between the fingers thin layers of hair strands in either a horizontal or a vertical orientation. For example, as shown generally at 33, hair strands 36 have been picked up in a horizontal pattern. As shown generally at 37, hair strands 35 have been picked up in a vertical pattern. Although it is unlikely that the head form of FIG. 5 would be used for actual cutting practice, it is beneficial for teaching of the techniques of isolating portions of the hair to be cut. This type of head form is also very useful in teaching parting patterns and in practicing the handling of hair strands in a uniform and controlled manner as is necessary for bleaching and coloring of hair.

Figure 6:
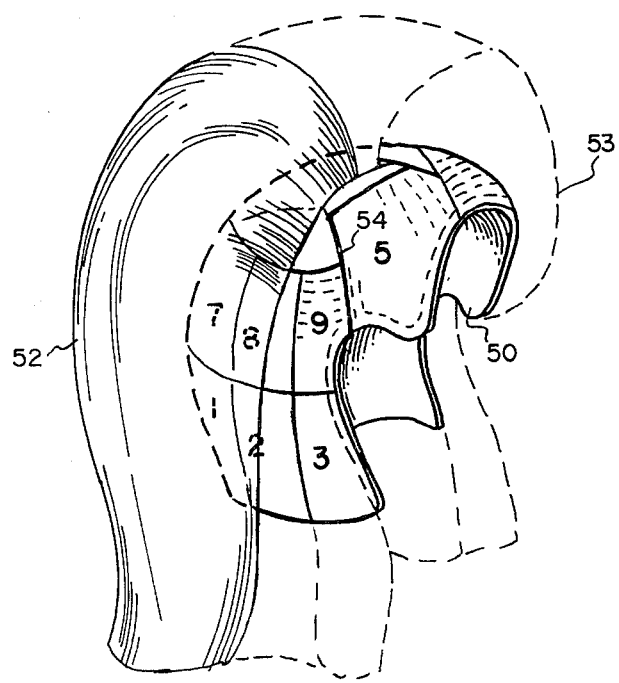
FIG. 6 is an alternative form of the invention using a partial head form.

Although the invention has been described above in terms of a head form 10, an alternative embodiment may utilize a skull cap type form. In FIG. 6, a skull cap 50, formed from thin rubber, plastic or the like is shown. Skull cap 50 may be installed onto a plain, smooth surface head form such as commonly available for wig stands, as millinery heads, and the like. The outer surface of cap 50 is marked off with any of the markings 54 as previously described and hair strands 52 are sewn or cemented into the cap 50 as shown at 52 and 53. While this alternative embodiment is illustrated as a skull cap 50, a full head and face type form of thin rubber which could be slipped over a solid head form is also practical.

It is contemplated that the teaching aid type head form of the invention would be produced in sets of forms with each form marked with markings adapted to teach a particular style, skill, or technique, and to provide means for self-teaching when an instructor is not available. While certain specific implementations of my invention have been disclosed herein, it will be obvious to those of skill in the art to make numerous changes or modifications thereof without departing from the spirit and scope of my invention.

I claim:

1. An instructional aid for teaching hairstyling and the like comprising:
    a mannequin head form representative of a human head;
    a plurality of markings on the hair bearing surface of said head form for indication of a hairstyling technique, said markings forming a guide for the hairdresser in practicing hairdressing; and
    hair strands attached over said markings on said hair bearing surface, said markings formed to be visible during use of said mannequin head.

2. An instructional aid for teaching hairstyling and the like comprising:
    a cap formed from a thin, flexible material approximately the size and shape of the hair bearing portion of a human head;
    a plurality of markings on the outer surface of said cap for providing a guide to a hairdresser in practicing a hairstyling technique; and
    hair strands attached over said markings on the outer surface of said cap to simulate a human head of hair, said markings formed to be visible during practicing of a hairstyling technique.

3. The instructional aid as defined in claim 1 or 2 in which said markings comprise blocking lines defining blocks in which hair is attached therein and which is to be handled in a prescribed manner.

4. The instructional aid as defined in claim 3 in which said blocks include direction indicating lines for defining the direction of application of curling rods and for placing of fingers during hairdressing.

5. The instructional aid as defined in claim 3 in which said blocks include indicia for identifying said blocks.

6. The instructional aid as defined in claim 1 or 2 in which said markings include curl shape outlines for indicating approximate size and location of hair curls to be formed.

7. The instructional aid as defined in claim 1 or 2 in which said markings include arrows for indicating directions of finger waves.

8. The instructional aid as defined in claim 1 or 2 in which said markings include an array of dots forming essentially vertical and horizontal rows of said dots for indication of directions of hair partings and sectioning of hair layers for cutting, bleaching, and coloring.

9. The instructional aid as defined in claim 1 in which said form includes means for mounting said form on a base.

* * * * *